United States Patent [19]
Harris et al.

[11] Patent Number: 5,835,698
[45] Date of Patent: Nov. 10, 1998

[54] UNILATERALLY-CONTROLLED, TIME-INSENSITIVE, DATA-LINK RECOVERY APPARATUS AND METHOD

[75] Inventors: Jack C. Harris, Springville; David J. Mahlum, Spanish Fork, both of Utah

[73] Assignee: Novell, Inc., Provo, Utah

[21] Appl. No.: 717,486

[22] Filed: Sep. 20, 1996

Related U.S. Application Data

[60] Provisional application No. 60/015,179, Apr. 5, 1996.

[51] Int. Cl.$^6$ .................................................. G06F 1/00
[52] U.S. Cl. ........................... 395/182.13; 395/182.08; 395/183.02
[58] Field of Search ........................ 395/182.02, 182.13, 395/182.16, 105.01, 185.1, 200.12, 200.16, 182.14, 182.15, 182.18, 182.09, 569, 183.02; 364/266.5, 266.6

[56] References Cited

U.S. PATENT DOCUMENTS

| | | | |
|---|---|---|---|
| 4,926,414 | 5/1990 | Baratz et al. | 370/31 |
| 4,975,914 | 12/1990 | Ashton et al. | 371/11.2 |
| 5,027,269 | 6/1991 | Grant et al. | 364/200 |
| 5,027,316 | 6/1991 | Frantz et al. | 364/900 |
| 5,089,958 | 2/1992 | Horton et al. | 395/575 |
| 5,146,452 | 9/1992 | Pekarske | 370/16 |
| 5,155,842 | 10/1992 | Rubin | 395/575 |
| 5,167,010 | 11/1992 | Elm et al. | 395/50 |
| 5,175,847 | 12/1992 | Mellott | 395/182.09 |
| 5,210,746 | 5/1993 | Maher et al. | 370/79 |
| 5,235,599 | 8/1993 | Nishimura et al. | 371/11.2 |
| 5,237,677 | 8/1993 | Hiroswawa et al. | 395/183.21 |
| 5,278,977 | 1/1994 | Spencer et al. | 395/575 |
| 5,301,309 | 4/1994 | Sugano | 395/575 |
| 5,307,354 | 4/1994 | Cramer et al. | 371/12 |
| 5,363,503 | 11/1994 | Gleeson | 395/575 |
| 5,379,278 | 1/1995 | Safadi | 370/16 |
| 5,390,326 | 2/1995 | Shah | 395/575 |
| 5,414,817 | 5/1995 | Ezzet et al. | 395/275 |
| 5,420,917 | 5/1995 | Guzman | 379/279 |
| 5,426,770 | 6/1995 | Nuber | 395/500 |
| 5,426,773 | 6/1995 | Chabanet et al. | 395/182.02 |

(List continued on next page.)

FOREIGN PATENT DOCUMENTS

WO 95/24685  9/1995  WIPO ........................ G06F 17/30

OTHER PUBLICATIONS

Biersack, et al., "A Timer–Based Connection Management Protocol with Synchronized Clocks and its verification", pp. 1303–1319, Elsevier Science Publishers B. V., 1993.

Tamir, et al., "Application–Transparent Process–Level Error Recovery for Multicomputers", Department of Computer Science, University of California.

Stringini, et al., "Flexible Schemes for Application–Level Fault Tolerance", Symposium on Reliable Distributed Systems, pp. 86–95.

(List continued on next page.)

Primary Examiner—Joseph Palys
Attorney, Agent, or Firm—Madson & Metcalf

[57] ABSTRACT

An apparatus and method for unilaterally-controlled, time-insensitive recovery of disconnected data links provides for user-transparent recovery, without requiring inputs from a user or other intervention. Data and executable operations may be preserved, as re-booting is not required. Optionally, opportunity for user intervention may be provided, at a user's request. Recovery may occur automatically by use of expert knowledge applied to reported system errors from the disconnected communication link. An apparatus may rely on a logical device within an actuator or machine of mechanical, pneumatic, hydraulic, electrical or electronic character. A task to be reported to an actuator as successful or failed, may be internal to the actuator, internal to the logical device, or external to both. Data structures stored in a memory device, may implement the invention readily from within an application running on a processor in a computer. Information (data, operational steps) may be preserved at an atomic level of granularity.

29 Claims, 8 Drawing Sheets

U.S. PATENT DOCUMENTS

| | | | |
|---|---|---|---|
| 5,444,693 | 8/1995 | Arsian et al. | 370/16 |
| 5,444,695 | 8/1995 | Copley et al. | 370/17 |
| 5,457,556 | 10/1995 | Shiragaki | 359/117 |
| 5,463,764 | 10/1995 | Mueller | 395/183.22 |
| 5,481,699 | 1/1996 | Saether | 395/182.13 |
| 5,483,637 | 1/1996 | Winokur et al. | 395/183.22 |
| 5,586,937 | 12/1996 | Menashe | 463/41 |
| 5,594,861 | 1/1997 | Jonsson et al. | 395/181 |
| 5,613,060 | 3/1997 | Britton et al. | 395/182.13 |
| 5,627,964 | 5/1997 | Reynolds et al. | 395/183.22 |
| 5,649,136 | 7/1997 | Shen et al. | 395/591 |
| 5,664,088 | 9/1997 | Romanovsky et al. | 395/182.11 |
| 5,682,471 | 10/1997 | Billings et al. | 395/182.13 |

OTHER PUBLICATIONS

Schumann, et al., "Recovery–Management in the RelaX Distributed Transaction Layer", Symposium on Reliable Distributed Systems, pp. 21–28.

Pitts, et al., "Recovery in the Clouds Kernel", Department of Computer Science, University of Lowell, Lowell, MA 01854, Symposium on Reliable Distributed Systems, pp. 167–176.

Dranheim, et al., "A Reliable and Secure UNIX Connection Service", Department of Computer Sciences, University of Wisconsin, Madison, Wisconsin, Symposium on Reliable Distributed Systems, pp. 15–21.

Daniels, et al., "Real–Time Performance of a Completely Distributed Operating System", Computer Science Department, Wayne State University, Detroit, Michigan, Real Time Systems Symposium, pp. 157–163.

Johnson, "Reliability Mechanisms of the FDDI High Bandwidth Token Ring Protocol", Elsevier Science Publishers B. V., 1986, Computer Networks and ISDN Systems 11 (1986) pp. 121–131.

Nett. et al., "Implementing a General Error Recovery Mechanism in a Distributed Operating System", International Symposium on Fault Tolerant Computing Systems, 1986, pp. 124–129.

Lann, "Issues in Fault–Tolerant Real–Time Local Area Networks", Symposium on Reliable Distributed Systems, 1986, pp. 28–32.

Ebihara, et al., "Fault Diagnosis and Automatic Reconfiguration for a Ring Subsystem", Inst. of Information Sciences and Electronics, University of Tsukuba, Ibaraki, Japan, Elsevier Science Publisher B. V., 1985, pp. 97–109.

Moss, "Checkpoint and Restart in Distributed Transaction Systems", U. S. Army War College, Carlisle Barracks, PA, Symposium on Reliable and Distributed Systems, 1983, pp. 85–89.

Gertner, et al., "Experiences with Exception Handling in Distributed Systems", Prime Computer, Inc., Framingham, Mass., Symposium on Reliable and Distributed Systems, 1982, pp. 144–149.

Panzieri, et al., "Reliable Remote Calls for Distributed UNIX An Implementation Study", Computing Laboratory, The University of Newcastle upon Tyne, Newcastle upon Tyne, England, Symposium on Reliable Distributed Systems, 1982, pp. 127–133.

Tsuruoka, et al., "Dynamic Recovery Schemes for Distributed Process", C & C Systems Research Laboratories, Nippon Electric Co., Ltd., Kawasaki, Japan, Symposium on Reliable Distributed Systems, 1981, pp. 124–130.

UNILATERALLY-CONTROLLED, TIME-INSENSITIVE, DATA-LINK RECOVERY APPARATUS AND METHOD

BACKGROUND

1. Related Applications

This application is a continuation-in-part of a provisional patent application, Ser. No. 60/015,179, filed on Apr. 5, 1996 for a method and apparatus for connection auto-recovery.

2. The Field of the Invention

The invention relates to systems and methods for preserving data and continuing operations in the presence of network disconnections, and more specifically, to methods and apparatus for unilaterally controlling data and operations where preservation of data and continuation of operations is more important than some time delay of some significant extent.

3. The Background Art

Network servers are not on line or otherwise accessible one hundred percent of the time. Hardware connections may fail, be taken down for service, be disconnected intentionally, or be interrupted by numerous phenomena. Computer systems, servers, management software, and the like limit the time during which they will attempt to re-make a broken connection in a communication line or path. This may be referred to as "timing out".

Moreover, hardware and software developed for communications often require comportment of a device on each end of a communication link in accordance with a protocol. Absent "agreement" of the devices on each end of the communication connection, communication will not occur.

Also, a user may frequently be presented with certain options. A selection is typically mandatory. Options may be to abort an operation, such as a transfer of data, or the like, to retry to establish a communication link or to ignore a failure of communication, attempting to proceed with other operations, if possible.

For example, data base software may include modules that communicate with one another over a computer network, intranetwork, through mutual access to a disk drive or disk array, through a cache system, through a distributed processing system, or through other communication links. A wide variety of communication links, involving hardware and software in a multiplicity of configurations, is known in the art.

However, errors, whether induced by hardware, software, routine maintenance, traffic, network congestion, deadlocks, interlocks, and other factors, may interrupt the communication connection. When a connection is lost, software simple times out, reports a link error, and processing typically stops.

Direct intervention by the user is required to reestablish the lost connection. Typically, the processing software must restart, and all valuable data may be lost. For example, when user intervention requires rebooting a client system on a network, valuable memory is cleared of all data. Meanwhile, the connection loss has typically prevented the storage of the data in a non-volatile memory device. What is needed is an apparatus and method adapted to provide restoration of communication connections without direct user intervention.

It would be beneficial to provide for optional user intervention as well. However, a system is needed to provide some information to a user indicating possible recovery paths. Ultimately, it would be valuable to provide automatic internal selection of various recovery paths, based on the error condition provided by linking software to an application needed to recover a connection. It would also be valuable to provide automatic recovery of an application and its supporting hardware to the exact state existing at the point that the link error occurred.

It would be beneficial to provide time insensitivity, whether for an instant or some arbitrarily long period, for a recovery apparatus and method to operate. Such time insensitivity should be independent of the error. The outcome should be independent of such time period. An implementation that may be loaded on a general purpose computer as software modules independent of any unique or special-purpose hardware or firmware is needed.

It is needed for an individual application running on a processor to act as a single point of action and knowledge, eliminating the need for coordination between software modules operating in different processors at different (opposite) ends of a link. All data, whether processed data or operational data internal to an application, should be recovered.

Although a method and apparatus operating independently from a user are needed, all data is not of equal value to a user. Accordingly, it may be valuable to provide an apparatus and method adapted to accommodate checks and selection of recovery paths as an option to a user.

Informative messages, even incorporating some amount of artificial intelligence would be beneficial. For example, although an error number, or some description of the nature of an error may be of marginal use to many users, some amount of expert knowledge may be incorporated beneficially. The expert knowledge may be used to process the error type and location.

A system may provide to a user a meaningful option to exercise. To accomplish this optional user selection under expert guidance, a method in accordance with the invention may be embodied directly within a user application. Thus, a method and apparatus may benefit from an insensitivity to network protocol, communication layer, or other external factors that are otherwise transparent to a user application running on a processor.

Unlike prior art devices, each fundamental element "atomic unit" of a data transaction should be recovered individually without conventional checkpoints or rollbacks. Also needed are a method and apparatus that require no conversation and or backward recovery, in place of no virtual machines or use of such. Recovery methods and apparatus should not require spare capacity or redundancy as known in the prior art.

Thus, a method and apparatus are needed that provide time-insensitive, automatic recovery actions without requiring user intervention, thus providing a recovery transparent to a user, simulating a fault-free system. The system should allow more advanced users to interject actions during a recovery, with the benefit of artificial intelligence applied to the errors.

BRIEF SUMMARY AND OBJECTS OF THE INVENTION

In view of the foregoing, it is a primary object of the present invention to provide a system for a unilaterally-controlled, time-insensitive, user-transparent, re-connection of disconnected data links.

It is an object of the invention to provide an apparatus and method adapted to application-controlled recovery of communication links.

It is an object of the invention to provide a single point, non-coordinated, time-insensitive, initiation of recovery of a disconnected communication link.

It is an object of the invention to provide automatic, internal selection of recovery steps as a function of an error condition provided by linking software.

It is an object of the invention to provide a recovery of an application to the exact state existing when a link error occurred.

It is an object of the invention to provide a recovery outcome that is independent of elapsed time prior to recovery.

It is an object of the invention to provide a link recovery method and apparatus that may be implemented on a general-purpose computer in an embodiment requiring only unique software, rather than unique hardware or firmware.

It is an object of the invention to provide a single point (network client, node, workstation) required to act or have information (knowledge), eliminating coordination between two sides of a disrupted communication link.

It is an object of the invention to provide a fault tolerance resulting in no data loss.

It is an object of the invention to provide an optional message, provided at the request of a user, and optional user intervention in accordance with the message.

It is an object of the invention to provide optional selection by a user of recovery steps (path, routines) and checks.

It is an object of the invention to provide an automatic recovery method, resident within an application, to be insensitive to network protocols, communication links, and other factors external to the application.

It is an object of the invention to provide independent recovery of each atomic data element, without requiring check points, rollbacks, conversations, or backward recovery.

It is an object of the invention to provide an apparatus and method providing automatic recovery of a communication connection with a minimum number of elements required, non-redundant, and time-independent.

It is an object of the invention to provide artificial intelligence for selection of recovery steps (path, routines).

It is an object of the invention to provide a time-insensitive, automatic, user-transparent, recovery system selectively ignorable and intervenable by a user.

Consistent with the foregoing objects, and in accordance with the invention as embodied and broadly described herein, an apparatus and method are disclosed in one embodiment of the present invention as including a node connected to a network, the node having a processor and a memory device operably connected. The processor hosts an application having a module effective to provide a unilaterally-controlled, time-insensitive recovery of a communication link between the node and another node on the network or on another network connected to the network.

In one embodiment, the node may include an actuator having a signal generator. The signal generator may provide to a task-executing device a signal effective to initiate execution of a task. The task-executing device may be physically located within the actuator, within the node or external to either or both. The task-executing device may include its own signal generator for providing a signal to a shutdown transfer module or an executable hosted by the actuator.

The shutdown transfer executable may be within a logical device in the actuator. Thus, the actuator may be mechanical, electromechanical, electrical, electronic, pneumatic, hydraulic, or the like. Similarly, the logical device may be of any type capable of executing logic, electronic logic corresponding to one presently preferred embodiment.

The shutdown transfer executable may provide an instruction or signal to a shutdown executable, as a function of the signal provided by the task-executing device. If the task-executing device has successfully completed a task required, then the shutdown transfer executable may merely continue with operation of the logical device and the operation of the actuator. The shutdown executable may communicate to a recovery executable adapted to provide the unilaterally-controlled, time-insensitive task execution, transfer of data, or re-connection of a disconnected communication link.

Optionally, a user input device, within or without the actuator, may provide an interrupt signal. At a user's option, the interrupt signal may effect a request of outputs to a user. The interrupt signal may enable a user to select options for execution by the recovery executable. Depending on the selection made by the recovery executable, and optional user interrupts, the shutdown transfer executable may direct the logical device to operate to effect an abort of the operation of the actuator, a retry of an actuator signal generator to initiate the task of the task-executing device anew, or to simply continue operation of the actuator.

A user output device may also be provided. The user output device may provide feedback from a recovery executable to a user, incorporating artificial intelligence (AI). The AI may assist a user in coming to a decision as to an appropriate input for the optional user input device.

In one embodiment, an apparatus and method in accordance with the invention may include a CPU operably connected to a user input device for receiving optional user inputs. The CPU may be operably connected to control a transfer device hosting a transfer executable. The transfer executable may be programmed to transfer data from a source device to a destination device.

The CPU may include an operating system, data, and executables. Likewise, the CPU may host an application, comprising therein a transfer command. Upon execution of the transfer command, the transfer device may be instructed to execute the transfer executable. In the event that the transfer device is unsuccessful, an error message may be returned to the CPU A recovery module operating on the CPU, may be hosted within the CPU independently from an application, or may be imbedded within the application. However, in one presently preferred embodiment, the application controls the invocation of the recovery module. In turn, the recovery module provides a unilaterally-controlled, time-insensitive recovery of any disconnected communication link relied upon by the CPU, transfer device, source device or destination device. Accordingly, the recovery module may provide for either an abort, a retry, or an ignore instruction with respect to the application, transfer executable, and the error message, respectively.

In one embodiment of an apparatus and method in accordance with the invention, a memory device may include memory blocks storing executables and data. The executables may be operable on a CPU, and may be called from within an application, or imbedded within an application. Blocks may be allocated for supporting and storing an operating system, an application, a task executable, a recovery module or executable, a shutdown executable, and other data.

For example, other executables may also be stored in the memory device. Likewise, application data for inputs, outputs, and operational data may be stored in respective blocks. Similarly, a shutdown transfer executable may be stored within a block allocated to the application. Inasmuch as modern programming technology does not require continuous lines of code to be contiguously written to memory, the shutdown transfer executable may be stored in a separate block, yet be invoked by the executables associated with the application, when loaded from the memory device to a processor.

A block may be provided to store an abort executable effective to abort an application. Likewise, a user interrupt executable may be stored in a memory device containing data and executables for facilitating a user interrupt. Recovery control data, including messages, return codes, flags, and the like, may also be stored in the memory device.

In one embodiment of an apparatus and method in accordance with the invention, steps may be implemented to launch an application, to execute an application, and to transfer control to a task or task executable. Feedback may be provided to the application from a task executable.

According to the feedback provided, a shutdown executable may be invoked selectively. The shutdown executable may direct control of a processor hosting the application to abort or to execute recovery steps. Recovery steps may be invoked by a recovery process or recovery executable. In one embodiment, a recovery module or executable may include multiple, optional paths.

For example, one path may provide for inputs by a user, in accordance with a request by a user. Another path may provide automatic checking of an error type, and selection of a flag of setting of a flag by an expert system executable. In accordance with the logic of the recovery module, the recovery module may return a case statement, indicator, flag or the like, determining whether the application should ignore an error returned by the task executable, retry a setup for the task, and another transfer of control to the task executable, or to abort.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 8, is not intended to limit the scope of the invention, as claimed, but it is merely representative of the presently preferred embodiments of the invention.

Figure 1:
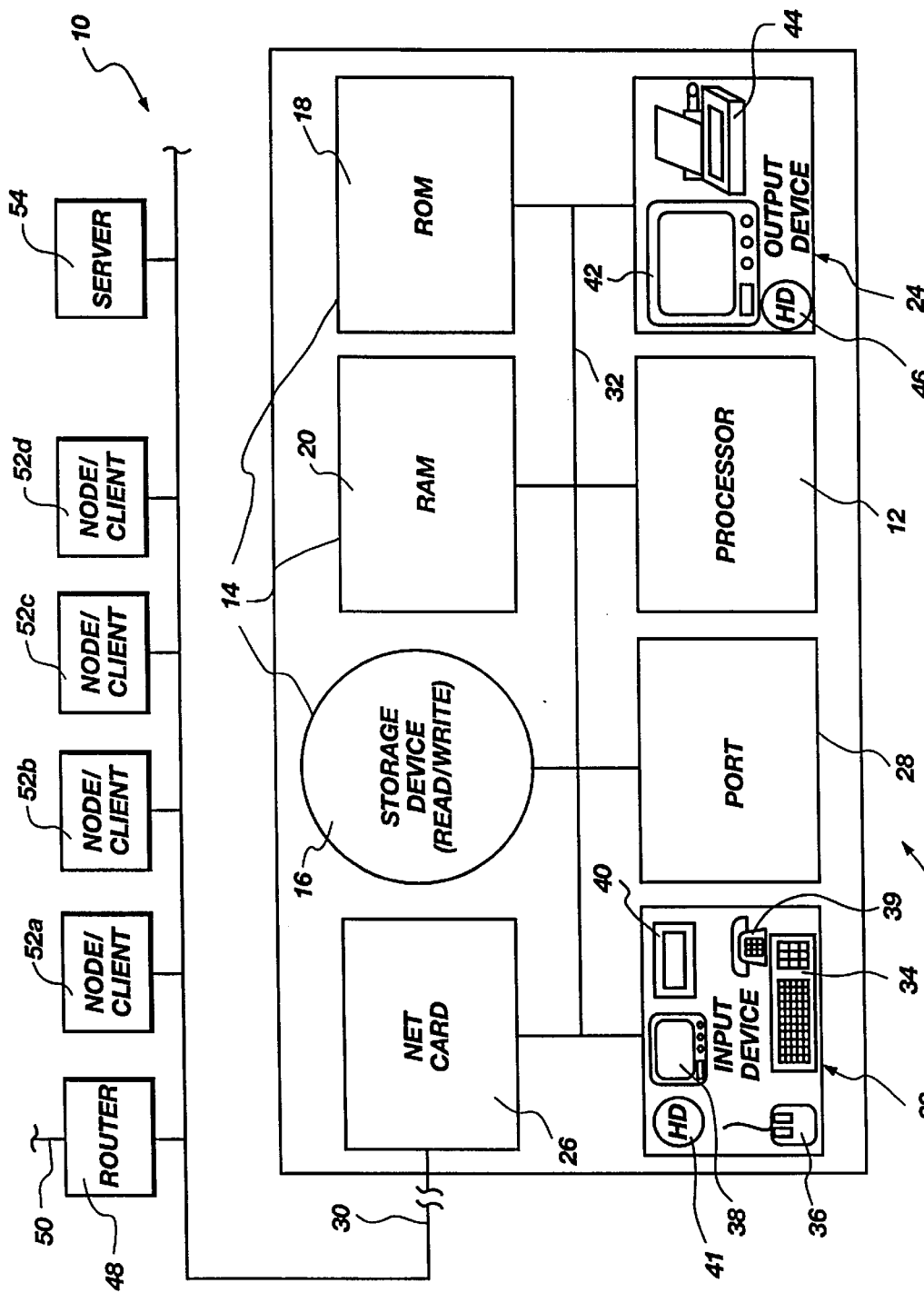
FIG. 1 is a schematic block diagram of an apparatus in accordance with the invention, including a node connected to a network, served by a server, and a router connecting the network to another network.

The presently preferred embodiments of the invention will be best understood by reference to the drawings, wherein like parts are designated by like numerals throughout. FIG. 1 is a schematic block diagram which illustrates an apparatus in accordance with the invention, wherein executables and applications operating in accordance with the invention may be hosted on one or more nodes in a network or networks.

Figure 2:
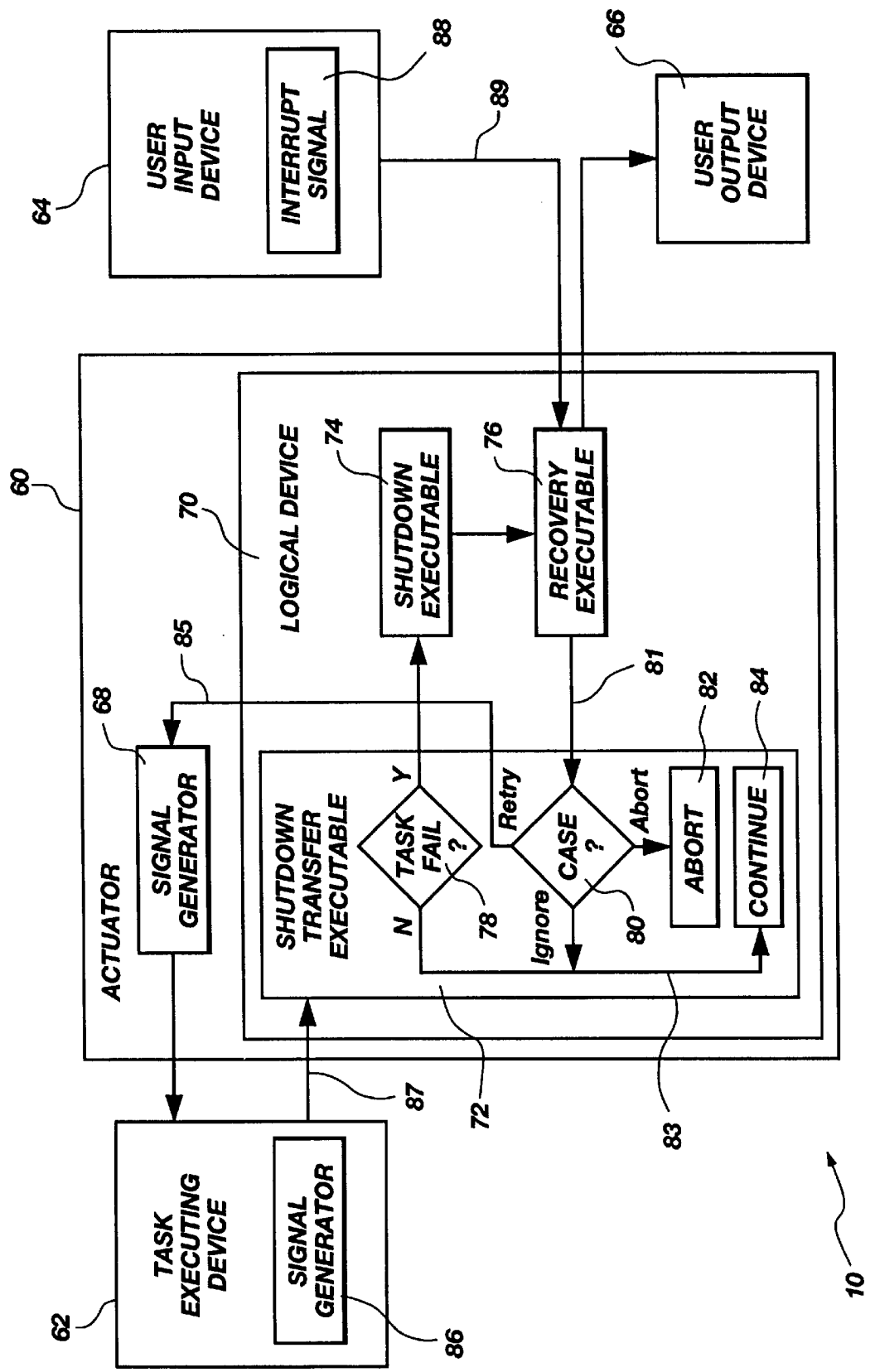
FIG. 2 is a schematic block diagram of an apparatus in accordance with the invention having an associated logical device and a task-executing device, which may be separate, independent, or both, with respect to the logical device and the actuator.

FIG. 2 is a schematic block diagram which illustrates a more general embodiment of an apparatus in accordance with the invention. In the apparatus of FIG. 2, a generalized actuator may operate with a logical device and a task-executing device to implement a method in accordance with the invention.

Figure 3:
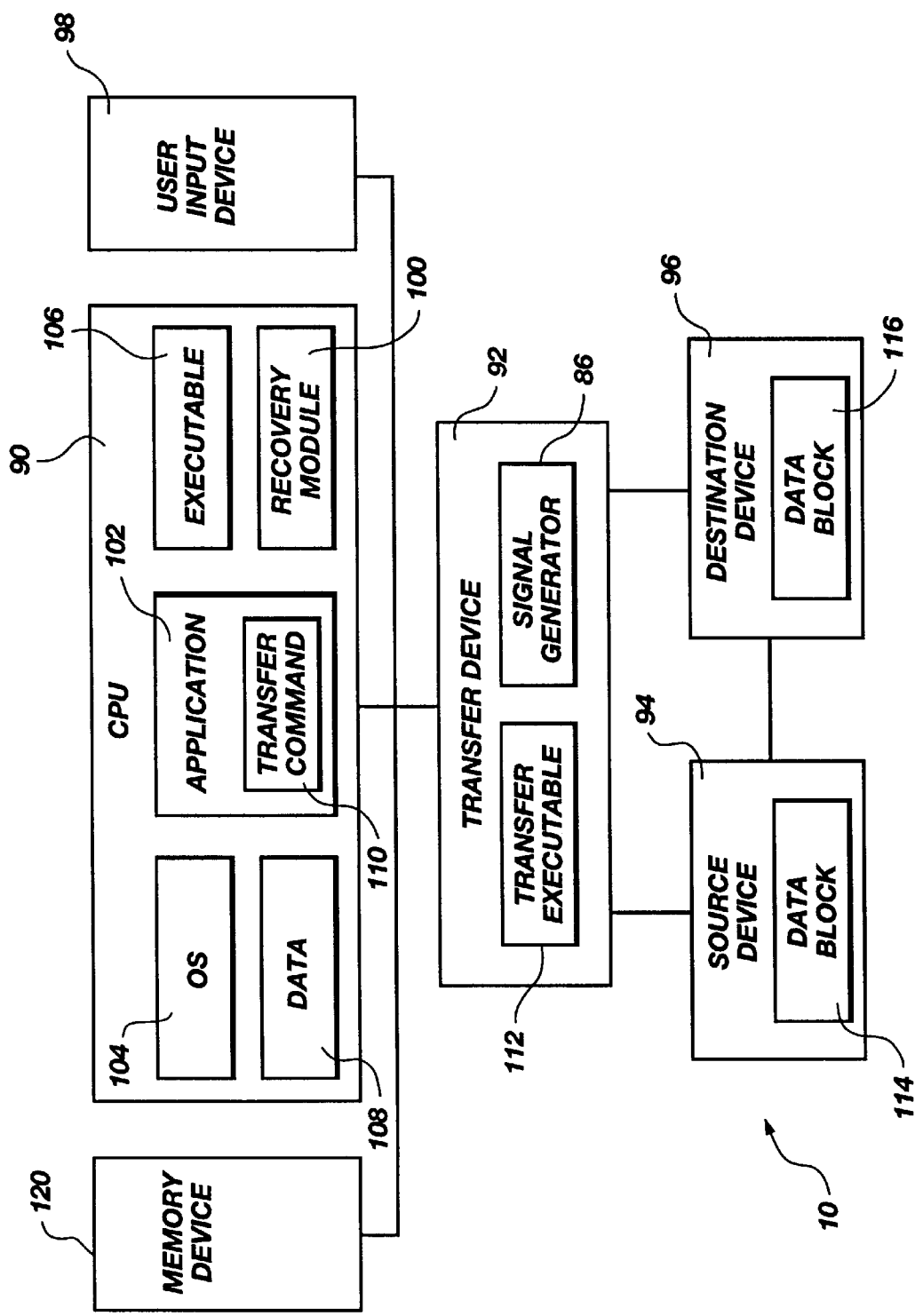
FIG. 3 is a schematic block diagram of an apparatus in accordance with the invention, as illustrated in FIG. 2, in which the task-executing device is a transfer device controlling transfer of data between a source device and a destination device, and in which the actuator and logical device are integrated into a CPU as an application and its associated executables.

FIG. 3 is a schematic block diagram of an alternate embodiment of the apparatus in FIG. 2, implemented for effecting data transfers in a network such as that of FIG. 1. The apparatus of FIG. 3 may be one implementation of the apparatus of FIG. 1. FIGS. 4–7 illustrate an embodiment of a memory device, which may be a part of the apparatus of FIGS. 1–3. FIG. 8 illustrates a schematic block diagram of a process that may be implemented in the apparatus of FIGS. 1–6, in accordance with the invention, to produce the benefits of the invention.

Those of ordinary skill in the art will, of course, appreciate that various modifications to the detailed schematic diagrams of FIG. 1–8 may easily be made without departing from the essential characteristics of the invention, as described. Thus, the following description of the detailed schematic diagram of FIGS. 1–8 is intended only by way of example. It simply illustrates certain presently preferred embodiments of the invention as claimed herein.

Referring now to FIG. 1, an apparatus 10 may include a node 11 (client 11, computer 11) containing a processor 12 or CPU 12. The CPU 12 may be operably connected to a memory device 14.

A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 41 may be used as an input device whether resident within the node 11 or some other node 52 on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user four feet back during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52A, 52B, 52C, 52D may have various communication capabilities.

In certain embodiments, a minimum of logical capability may be available in any node 52. Note that any of the individual nodes 52A–52D may be referred to, as may all together as a node 52. A network 30 may include one or more servers 54. Servers may be used to manage, store, communicate, transfer, access, update, and the like, any number of files for a network 30.

Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices. Likewise, a communication link may fail between any two devices for any of a host of reasons.

Thus, the apparatus 10 of the invention provides for reconnection of any communication link automatically, without requiring user intervention, and without losing data or losing track of operational steps completed and remaining. In the apparatus 10 of FIG. 1, the processor 12 and RAM 20 may implement one embodiment of the invention between themselves. Thus, the processor 12 in moving data from one location in RAM 20 to another location in RAM 20 may implement the invention to assure that no data is lost, and no process steps are lost.

In one embodiment of an apparatus 10, in accordance with the invention, an actuator 60 may be used. In general, an actuator 60 may implement any physical connections and signal generation required to support some task-executing device, and some logical device. Thus, the actuator 60 may be thought of as the node 11 or the processor 12. Similarly, the actuator 60 may operate with other components such that the logical device 70 serves as the processor 12 or the node 11. In other embodiments, the actuator 60 may be a mechanical device provided with some logical device 70 completing logical operations which many modern machines may execute in a processor 12, but which processes may not necessarily require a modern, electronic, digital computational capability.

Thus, in general, the actuator may be thought of as a general purpose apparatus 10, or computer 11. The logical device 70 may be thought of as a general or generalized processor 12 implementing a program, which may or may not be digitally encoded. Likewise, the task-executing device 62 may be thought of as a generalized process operating on a processor 12.

That is, it is common today for individuals unskilled in the art of computers, engineering and the like, to think of computation by machines as a new process. However, computation and logic have been embodied in pneumatic, hydraulic, fluidic, electrical, mechanical and other devices for many years. For example, a player piano may embody a computer program in which the computer is a simple digital positioning of a piano key in accordance with a perforation in a paper tape. Thus, in general, the apparatus 10 of FIG. 2 is a generalized partial embodiment of the apparatus 10 of FIG. 1, not restricted to a computer program or communication link of a modern, digital variety.

Referring now to FIG. 2, an actuator 60 adapted to communicate with a task-executing device 62 may cause initiation of a task by a task-executing device 62. The task-executing device 62 may be a part of an actuator 60, or may be remote or even independent.

A user input device 64 may also be operably connected to the actuator 60. The user input device 64 is not required in all embodiments of an apparatus 10 in accordance with the invention. Nevertheless, certain embodiments of the apparatus 10 may benefit from inclusion of a user input device 64. Likewise, for user interaction, a user output device 66 may be beneficially included in an apparatus 10. In general, the devices 62, 64, 66 may be integrated within the actuator 60 or logical device 70, or be external thereto.

Still referring to FIG. 2, the actuator 60 may be provided with a signal generator 68. The signal generator may turn control of some operation to a task-executing device 62. Alternatively, the signal generator 68 may simply initiate execution of some task by the task-executing device 62.

The actuator 60 may include a logical device 70. The logical device 70 may include a process or apparatus performing the function of a shutdown transfer executable 72. The shutdown transfer executable is effective to receive a signal from the task-executing device 62, which signal indicates whether or not the task being executed by the device 62 was executed successfully.

The shutdown transfer executable 72 may determine, on the basis of the status of the task-executing device 62, to initiate or transfer control to a shutdown executable 74. In turn, a shutdown executable 74 may invoke a recovery executable 76. The recovery executable 76, however, may also be actuated by a user input device 64. That is, in one embodiment of an apparatus in accordance with the invention, a user may indicate a desire to influence the process executed by a recovery executable 76. The user may provide an input through the user input device 64 to be communicated to the recovery executable 76, thus affecting operation of the recovery executable 76.

A test 78 may be provided within the shutdown transfer executable 72 to operate on a signal provided by the task-executing device 62. That is, in one embodiment, a signal generator 86 may provide some output or signal eventually resulting in a signal 87 transferred by the task-executing device 62 to the logical device, and more specifically to the shutdown transfer executable 72. Thus, the shutdown transfer executable 72 applies a test 78 to determine whether the task-executing device 62 was successful or failed. Success may result in a continuation 84 of whatever processes were operating in the logical device 70, the actuator 60 and the task-executing device 62.

On the other hand, if the test 78 shows a failure, then the shutdown transfer executable 78 may invoke the shutdown executable 74 to begin operation of a recovery executable 76. The recovery executable 76 determines whether the best approach is to ignore the failure or error in the task-executing device 62, whether to go back to the signal generator 68 and begin a new execution of the task-executing device 68, or whether to terminate operation of the logical device 70 or even the actuator 60.

Thus, a test 80 receives an input 81 or signal 81 from the recovery executable 76. Within the signal 81 is an indication of the determination made by the logical device 70 in the recovery executable 76 as to the proper steps to take. Accordingly, the shutdown transfer executable 78, upon receipt of the signal 81, applies a test 80. Accordingly, the shutdown transfer executable 78 may ignore the error from the task-executing device 62 and continue 84. Alternatively, the test 80 may initiate an abort 82. Alternatively, the test 80 may return a signal 85 or instruction 85 to the signal generator 68.

The signal 85 and the signal 83 indicating a retry or reinitiation of the task in the task-executing device 62, or a continuation of operations in the task-executing device 62 and the actuator 60 need not be timed out. In one presently preferred embodiment of an apparatus and method in accordance with the invention, the signals 83, 85 may be effectively never timed out.

By never is meant a relatively long time, compared to a conventional time out signal. Currently, most prior art devices time out after fractions of a second or seconds. Not timing out for more than a minute, particularly for more than ten minutes, is unheard of. Likewise, maintaining the signals 83, 85 without timing out over a period of hours or days is heretofore unthinkable. Nevertheless, in an apparatus and method in accordance with the invention, if the recovery executable 76 in the logical device 70 determines that a retry signal 85 or a continue signal 83 is appropriate, then the task-executing device 62 maintains its configuration, loses no data, and may continue at its first opportunity.

Applying the apparatus 10 of FIG. 2 to the apparatus 10 of FIG. 1, a processor 12 may embody the logical device 70 by hosting the shutdown executable, the recovery executable, the shutdown transfer executable, as well as the signal generator 68. Thus, the task-executing device 62 (which may also be hosted in the processor 12 or in some other processor 12 in another node 52 or on another network 50) may resume operation whenever necessary data or other conditions exist. Thus, to a user, no server 54, shutdown for an extended period of time, need be cause for cessation of an application running on the processor 12, nor cause for loss of data stored in the volatile RAM 20.

The user input device 64 may provide an interrupt signal generator 88. The interrupt signal generator 88 may be a source of a signal 89 communicating to the logical device 70, and more specifically to the recovery executable 76, the desire of a user to influence the output signal 81 to be tested in the test 80. In one presently preferred embodiment, the user input device 64 is not present. In other alternative embodiments, the user input device 64 is present, but is not required to be used by a user. However, the user input device 64 does enable a user to indicate a willingness or interest in monitoring the nature of an error encountered by the task-executing device 62 and to act thereupon.

For example, a user may determine that certain data is not important and may be discarded. Accordingly, a user may select the abort 82 as an option as a matter of convenience. However, a user may also provide a signal 89 indicating a desire to select either an ignore signal 83 or a retry signal 85. Accordingly, a user may receive through the output device 66 expert information interpreting the nature of the error of the task-executing device 62. Thus, a user may provide a signal 89 having already learned something about the nature of the error encountered, and the nature of the most probable selection in the test 80.

Referring now to FIG. 3, an apparatus 10 may include a processor 90 or CPU 90. The CPU 90 may be operably connected to a task-executing device 62 such as the transfer device 92. In the case of a transfer device 92, a source device 94 may be a source of data 114, while a destination device 96 may be the host or destination selected to receive data in a data block 116.

A user input device 98 may be provided for interaction with a user, such as for providing interrupt signals to the processor 90. A memory device 120 may be operably connected to the processor 90 for operational storage purposes. The memory device 120 may store all or part of certain executables and data to be used by and within the processor 90.

For example, the CPU 90 may run a recovery module 100. Likewise, an application 102 or multiple applications 102 may be hosted on the processor 90. According to current conventions, the application 102 may be loaded in whole or in part in the processor 90 at any given time.

An operating system 104 may be hosted in the processor 90. One or more executables 106, independent of the application 102, may also be hosted in the processor 90. One or more blocks of data 108 may be loaded into and out of the processor 90 as needed. Thus, the executables and data (100–108) may be loaded into the memory device 120, this processor 90, or partly in each, as deemed appropriate for efficient operation of the processor 90.

The data 108 may include various blocks of data associated with the operating system 104, the application 102, the executables 106, the recovery module 100, and the like. Similarly, data accessed by the transfer device 92 may also be stored in the processor 90 for some period of time.

In one embodiment of an apparatus in accordance with the invention, the application 102 may include a transfer command 110 or equivalent executable. The transfer command 110 may be effective to invoke the transfer device 92. Within the transfer device 92 may be included some form of a transfer executable 112. The transfer executable 112 is a specific example of an executable that might be included in a task-executing device 62 in the apparatus of FIG. 2.

Referring again to FIG. 3, the transfer executable 112 may be responsible to transfer data from a data block 114 in a source device 94 to a data block 116 within a destination device 96. The transfer device 92 may be successful, or may fail, in attempting to execute the task of transferring data from the source device 94 to the destination device 96. Accordingly, the transfer device 92 may include a signal generator 86 effective to notify the processor 90 if the transfer executable 112 is unsuccessful in completing a transfer of data.

Figure 4:
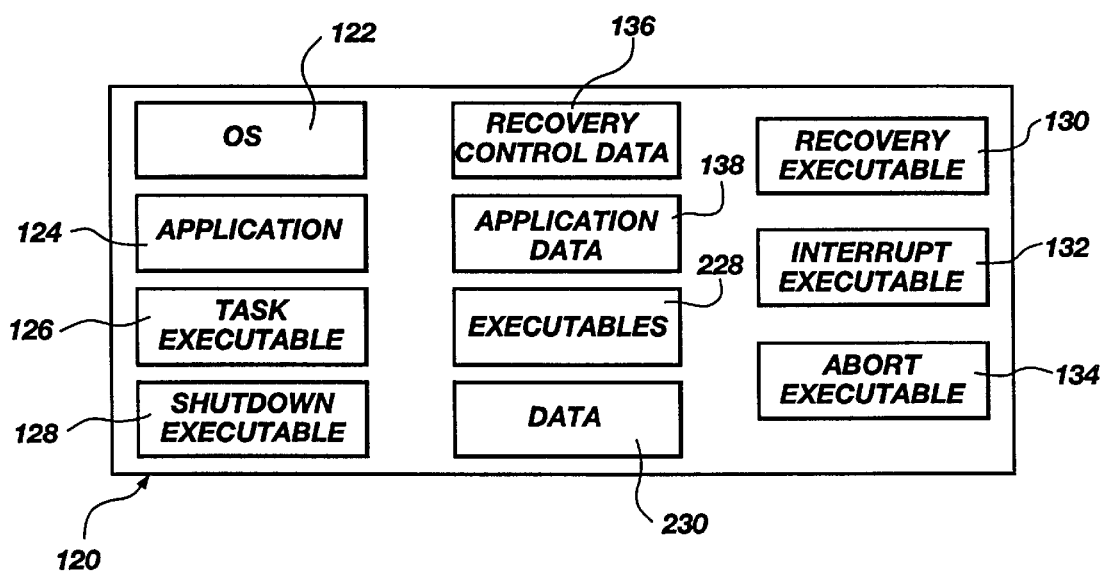
FIG. 4 is a schematic block diagram of a memory device storing executables and data in accordance with the invention.

Referring now to FIG. 4, a memory device 120 may be a specific example of a memory device 14 (see FIG. 1), or a memory device 120 (see FIG. 3). In one embodiment, in accordance with the invention, the memory device 120 may store, either temporarily or permanently, either in whole or in part at any given time, or otherwise as known in the art, an operating system 122. The operating system may be effective to instruct the processor 90 as known in the art. One or more applications 124 may be stored in the memory device 120.

In addition, a task executable 126, such as a software module effective to operate a transfer device 92, or a task-executing device 62 implemented in a computer, may be stored in the memory device 120. A shutdown executable 128 may be stored in the memory device 120 to serve the purpose of a shutdown executable 74 in a generalized actuator 60, as implemented in a computer 11.

The memory device 120 may also store a recovery executable 130 effective to perform the function of the recovery module 100 of FIG. 3, or the recovery executable 76 of FIG. 2. Likewise, an interrupt executable 132, effective to provide an interrupt signal to a processor 90 or actuator 60 such as from a user input device 64, 98 may be stored in the memory device 120.

An abort executable 134 may be provided in the memory device 120. The abort executable 134 may be effective to perform the abort function indicated by the abort 82 of FIG. 2. The abort executable 134 may be loaded into the processor 90 of FIG. 3 in order to properly shut down the application 102 running on the processor 90, in accordance with a user abort input provided by the user input device 98. Similarly, the user input device 64 of FIG. 2, may generate an abort instruction resulting in the abort 82 of FIG. 2.

Certain data may also be stored in the memory device 120 for proper operation of the application 124, and the recovery executable 130. For example, recovery control data 136 useful to the recovery executable 130 in executing its function, may be stored. Also, application data 138 useful as input, output or intermediate process data for the application 124 may be stored. In general, the application 124 may take on the characteristics of the application 102 running on a processor 90, or the functions of the logical device 70, of FIG. 2.

Other executables 228 may be stored in the memory device 120. The executables 228 may be independent of the application 124, or may serve as library executables or other executables necessary to or independent from the operating system, the operating system 122, application 124, recovery executable 130 and so forth.

Additional data 230, related on unrelated to the operating system 122, application 124, and recovery executable 130 may be stored in the memory device 120.

Figure 5:
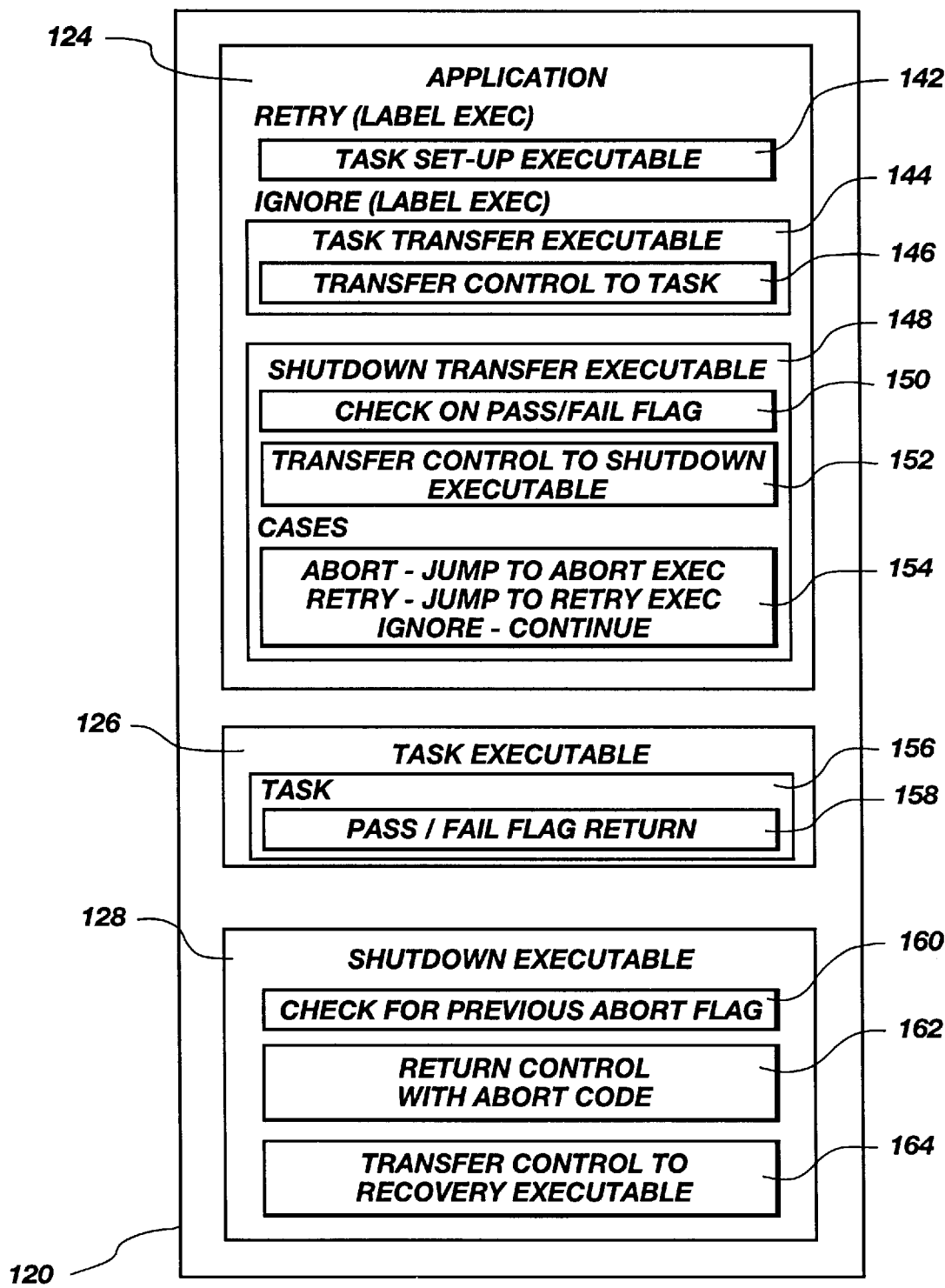
FIG. 5 is a schematic block diagram of the recovery executable, shutdown executable, recovery control data and user interrupt executable illustrated in FIG. 4.

Referring now to FIG. 5, the memory device 120 is illustrated to show additional details of the application 124, the task executable 126, and the shutdown executable 128. In FIG. 5, the application 124 may include several individual functions, steps, portions, executables, or the like. The application 124 may include a task setup executable 142. The executable 142 may be one of several such executables 142.

An application 124 may have many tasks to perform. Many of the tasks may be protected against loss of data. Other tasks may be unprotected. In one embodiment of an apparatus and method in accordance with the invention, tasks that are protected against loss of data may be of primary importance. In each task executable 126 may be a task 156 to be performed.

An application 124 may typically set up data, parameters, memory, files, or the like to prepare for proper execution of a task executable 126. Thus, the executable 142 performs such setup functions. In the event that the recovery executable 130 (FIG. 4, FIG. 6) results in a retry, the task setup executable 142 may be run anew before an application 124 returns to retry a task executable 126.

An application 124 may also include a task transfer executable 144. The task transfer executable may include a transfer function 146 to transfer control of the processor 90, 12 to the task executable 126. In the event of the recovery executable 130 returning an ignore instruction to the application 124, or directly following a task setup from the executable 142, a transfer executable 144 may transfer control to the task executable 126.

A shutdown transfer executable 148 may be provided within an application 124. The shutdown transfer executable 148 may routinely check for the presence of a pass/fail flag returned from the task executable 126. If the flag returned indicates a failure by the task executable to complete the task 156, then a transfer executable 152 may directly follow the check 150.

The transfer executable 152 may be effective to transfer control of the processor 90, 12 to a shutdown executable 128. This module 152 may invoke certain steps to provide an intelligent recovery by the recovery executable 130. The transfer executable 152 transfers control of the processor 12, 90 to the shutdown executable 128.

In certain circumstances, a case 154, or case test 154 may operate on the results of the recovery executable 130. Accordingly, if the case selected by the recovery executable 130 corresponds to aborting the application 124, then an abort executable 134 may be invoked (see FIGS. 4, 7). If an instruction corresponding to a retry is provided from the recovery executable 130, then the case 154 may direct the application to the task setup executable 142 (a retry label, for example). If the case 154 results in the recovery executable 130 returning an ignore instruction or its equivalent, the task transfer executable 144 may simply be reinvoked, and control may pass from the application 124 to the task executable 126, again.

One may note that the task executable 126 includes a task 156 and a flag return 158. The task executable 126 may include other steps. Nevertheless, at least one functional task 156 is provided. The flag return 158 may correspond to the signal generator 86 of FIG. 2, and FIG. 3. The flag return 158 may be of any suitable type capable of indicating to the application 124 that the task 156 has failed.

The shutdown executable 128 may include a test 160. The test 160 may determine whether or not a previous abort flag was set for any reason. That is, an abort flag, set by a user, should not be ignored, and thus, may be checked routinely. Thus, the test 160 may provide for cancellation of any attempts to salvage an application 124 or its associated data, where a recovery attempt might otherwise be automatically made. If an abort flag does appear in the test 160, then the return 162 may return control of the processor 12, 90 to the application 124 or the recovery executable 130, with an abort flag set to invoke the abort executable 134.

A negative response to the test 160 may result in invocation of the transfer 164. The transfer 164 may transfer control of the processor 12, 90 to the recovery executable 130. The recovery executable 130, in accordance with the invention, may then attempt to salvage the application 124 and its associated data, without requiring user intervention, rebooting or other inconveniences.

Nevertheless, the interrupt executable 132 whether implemented in software, hardware, or other devices (see FIG. 2, user input device 64, and FIG. 3, user input device 98) may allow a user to override the intelligence built in to the recovery executable 130. Thus, the options of a user are preserved, while not imposing on the application 124 a timing out of any options, nor requiring a user to intervene.

Figure 6:
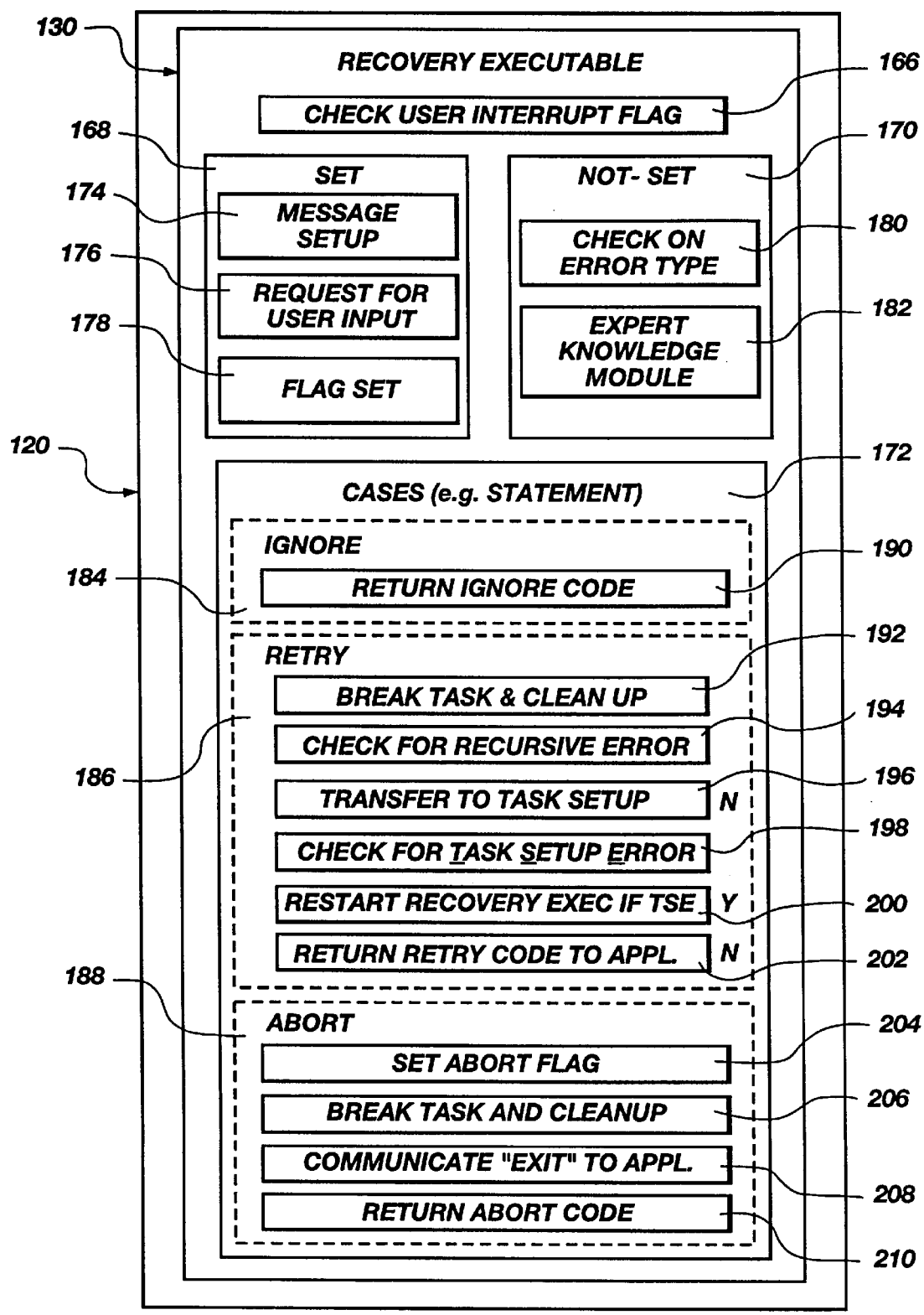
FIGS. 6–7 are schematic block diagrams of portions of the memory device of FIG. 4, showing blocks allocated to an operating system, task executable, application data, other executables, other data, as well as the application, abort application executable, and application data.

Referring now to FIG. 6, a memory device 120 may be configured to store a recovery executable 130 to be run on a processor 12, 90. The memory device 120 may be any of the memory devices 14 of FIG. 1. Nevertheless, the RAM 20 may be a suitable memory device 120. The recovery executable 130 may include a test 166 or check 166 effective to determine whether or not an interrupt has been received, such as from a user input device 64, 98.

If a user interrupt flag has been set, then the set executable 168 may be run. Otherwise, the not-set executable 170 may be run. Following execution of the set 178 or not-set 170, the cases 172 or case statement 172 may be run.

In one embodiment, the set executable 168 may execute a message setup 174 followed by a request for user input 176. In an apparatus and method in accordance with the invention, an inventor is not locked into providing inputs at a single place selected by an application. Moreover, the user is not required to provide inputs. A user can, however, obtain information concerning the status of the task 156 at any time during the execution of the recovery executable 130. Thus, any time the recovery executable is called or run, the inventor may engage the user interrupt executable 132, causing the request 176 to conduct a dialogue to collect user inputs. Unlike prior art devices, a user has a way to input a change of mind.

It is important to remember that the recovery executable 130 may be contained within an application 124, or may simply be called as an independent routine, linked as a dynamically linked library (DLL), as may other executables and data implemented in the invention.

A flag set 178 may rely on inputs from the request 176. For example, a user may consciously decide to abort, to retry, or to ignore. Nevertheless, the test 166, absent an interrupt flag engaged by the user interrupt executable 132, proceeds without user intervention.

The not-set executable 170 may be run if no interrupt flag is set, a negative response to the test 166 occurs. A check 180 may then test for the type of error occurring. Depending on the type of error occurring, an expert knowledge module 182 may be run to determine the proper, most probable, preferred, recommended, or best recovery action.

For example, certain knowledge may be available in association with each error type detected by the test 180. Based on the error, statistical information may be available identifying whether, for example, a reset or an ignore approach would be best to recover the execution of the task 156. It would typically be improper for the expert knowledge module 182 to recommend an abort.

Nevertheless, the probability that an ignore, or a retry would be the proper response, can be known. This information can be presented to a user, later. For example, a not-set module 170 may proceed in one execution of the recovery executable 130, while a subsequent running of the recovery executable 130 may detect an interrupt flag at the check 166. Thus, upon processing a message setup 174, a user may be informed of the analysis of an expert knowledge module 182. Thus, a request 176 may provide feedback to a user suggesting a user's response.

Following execution of a set module 168 or a not-set module 170, a case statement 172 may be run. The case statement may proceed to operate on outputs provided by the set 168 and not-set 170. If the elected course of action is to ignore, an ignore case 184 may execute a return 190 returning a code indicating that the application 124 should ignore the error, and proceed with the task 156. If the case set by the flag set 178 over the expert knowledge module 182 indicates that a retry should be attempted, then the retry case 186 may be executed. Similarly, if a user has intervened to provide a flag set 178 indicating that the application 124 should be aborted, then the abort case 188 may be executed. The ignore case 184 need only return an ignore code 190. A retry 186 may typically execute a break and cleanup 192. For example, certain data and executables may need to be returned to a suitable condition in order to re-run the task executable 126.

Likewise, a test 194 or check 194 check to determine whether or not some recursive error has occurred. If a recursive error has not occurred, then a transfer 196 may transfer control to the task setup executable 142 in the application 124.

Regardless, a test 198 or check 198 may evaluate whether or not a task setup error has occurred. A positive response to the test 198 may result in a restart command 200 to restart the recovery executable 130. A negative response to the test 198 may leave available the return 202 of a retry code to the application 124. A retry code may initiate execution of the task setup executable 142 anew.

The abort case 188 may execute a set 204 or set flag 204 to indicate that an abort has been requested. Meanwhile, a break and cleanup 206, similar to the break and cleanup 192 may be executed to undo the work of the task setup executable 142.

With data and executables returned to their proper conditions, a communicate exit 208 may be executed, indicating to the application 124 that an exit is to be completed. The application 124 typically has an exit protocol provided. Meanwhile, the return executable 210 may return an abort code. The returns 190, 202, and 210 may be stored to be run by the recovery executable 130. Each may include a single command, or a series of executable commands, or the like. The result of each of the returns 190, 202, 210 may be provided as some data indicator to control the cases 154. Cases 154 include the response of the application 124 in the case of selection of an abort, a retry or an ignore response. For example, a jump to a particular label heading appropriate steps may be executed for a case 154 in accordance with the return 190, 202, 210 received by the application 124.

Figure 7:
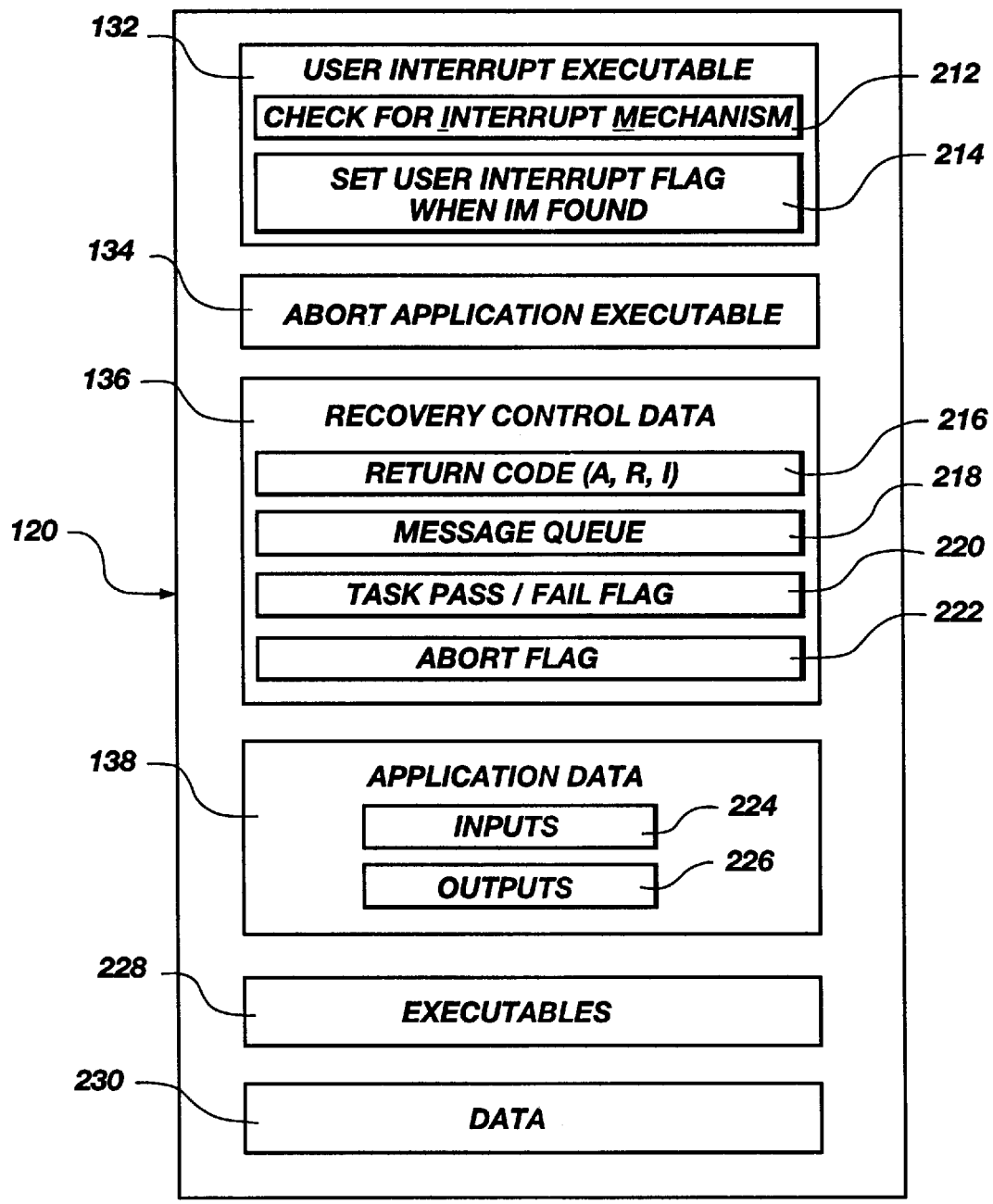
Figure 8:
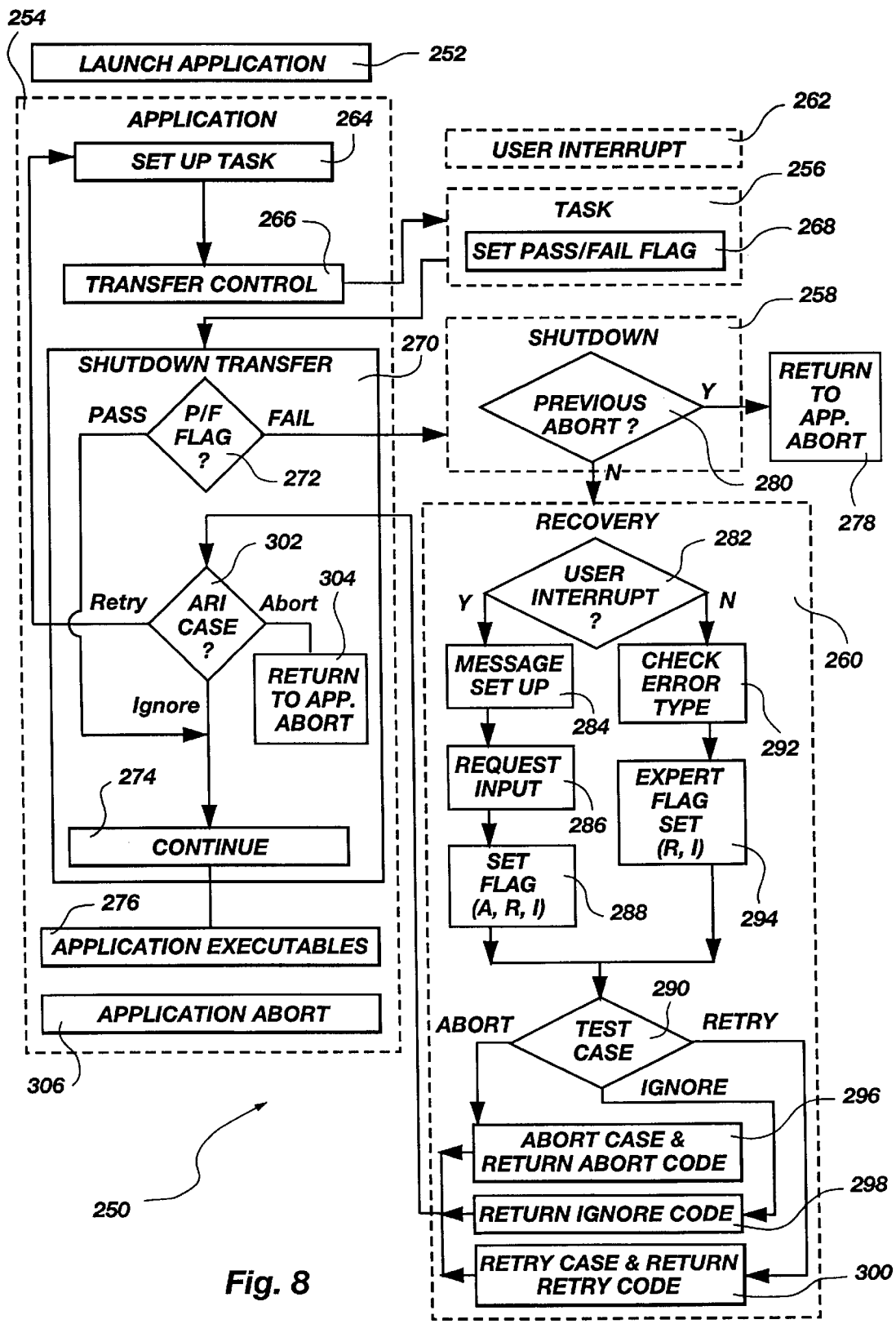
FIG. 8 is a schematic block diagram of a method in accordance with the invention, executable on the apparatus of FIGS. 1–3, and storable in the memory devices of FIGS. 4–6.

Referring now to FIG. 7, an interrupt executable 132 may include a test 212 or check 212 to determine whether or not some interrupt mechanism has been engaged. For example, a flag may have been set, or an interrupt signal may have been generated by user input device 64, 98 (see FIGS. 2, 3).

If a signal is detected from an interrupt mechanism, then a flag may be set by a set flag module 214.

As a practical matter, the user interrupt executable 132 may be in an application, external to an application, may be in the operating system 122, or may be located in both. Nevertheless, the user interrupt executable 132 is shown in the memory device 120 in a location independent of the operating system 122 and application 124.

An abort application executable 134 may be provided. The executable 134 may similarly be independent of the application 124, task executable 126, and the like. This may provide the abort executable 134 to be available or accessible during any point in the recovery process. In the prior art, some form of abort executable is typically integrated into the application. Typically, an application may invoke some abort command before first calling for transfer of control to a task executable 126.

In an apparatus and method in accordance with the invention, abort executable 134 may be available from within an application also. However, by being independent of an application, the abort executable 134 may be available at any time during the recovery process, including being called in a conventional place in the application 124, such as before transfer of control to the task executable 126.

The recovery control data 136 may include data associated with return codes 216. For example, the codes associated with selection of an abort, a retry, or an ignore may be stored in the return code 216. A message queue 218 may store messages to be transferred between executables. For example, a message queue may contain data shared by an operating system 104 and an application 12, may hold messages in a client processor, may store user interrupts, and the like.

A flag 220 may indicate a pass/fail for a task 156. The task pass/fail flag 220 may store the result determined by execution of the return 158 in the task executable 126. Likewise, the abort flag 222 may be set, in one embodiment, by the flag set 178 operated by a user, or by the flag set 204 within the abort case 188.

Application data 138 may include inputs 224, outputs 226, and the like. Application data 138 may include data provided to, output from, and used during processes within the application 124. Other executables 228 called by, or independent from, the application 124, the recovery executable 130, the task executable 126, and the like, may also be stored in the memory device 120. Similarly, other data 230 independent of or related to other data and executables within the memory device 120 may be stored.

In general, the recovery executable 130 and other associated executables may be imbedded within an application. Nevertheless, many executables may be stored in the memory device 120, and may be called, independently from one another and the application 124.

Referring now to FIG. 8, a method 250 my rely on a launch 252, an application 254 (corresponding to an application 124 stored in the memory device 120) operating in a processor 12, 90. A task 256 may be loaded in the processor 12, 90, with the application 254, or may be called, linked, or otherwise engaged from the application 254.

A shutdown 258 process may be accessed from the application 254 to be run on the processor 12, 90. The shutdown 258 may engage a recovery module 260 to be run on the processor 12, 90. A user interrupt 262 may be run on the processor 12, 90, or may merely result in a signal provided to the processor 12, 90 from another independent device. In one embodiment, the user interrupt 262 may be executed in the processor 12, 90 to receive a keyboard character or similar command from a user.

Referring to the application 254, a setup task module 264 may be executed early or late in the processing of an application 254. The setup module 264 or setup executable 264 may prepare the data and parameters required for a transfer executable 266 to transfer control of the processor 12, 90 to a task 256.

At some point in the task 256 or during the executing of the task 256, a set command 268, set instruction 268, or set flag executable 268 may be executed. The set flag executable 268 may set a flag to indicate to the application 254 whether or not the task 256 executed fully or failed to execute.

A shutdown transfer 270 may be imbedded within the application 254. In one currently preferred embodiment of an apparatus and method in accordance with the invention, a shutdown transfer 270 may receive, read, or otherwise access a flag set by set flag executable 268 in the task 256. The shutdown transfer 270 may contain a test 272 to evaluate a pass/fail flag. The pass/fail flag, from the set executable 268, if not set may register a pass.

Thus, the test 272 directs control past the further test 302 to execute a continue 274, continue instruction 274, continue executable 274, or the like.

The continue 274 directs the processor 12, 90 to proceed with other application executables 276, exiting the shutdown transfer 270 to do so. If the test 272 indicates a fail (failure of the task 256), then control may be passed to a shutdown 258.

If a previous abort has been indicated, then a return 278 may return control to the application 254 to execute an abort. Otherwise, the test 280 may pass control to a recovery module 260.

The recovery module 260 may include a test 282 to determine whether or not a user has signaled an interrupt. If the test 282 determines that a user interrupt was signaled, a message setup 284 may execute a message to set up the task 256 by executing the setup 264. Since a user has indicated an interrupt, a request 286 may provide feedback to a user, such as through a user output device 24, 66 (see FIGS. 1, 2).

The request 286 may provide feedback to a user indicating the best expected response by a user. For example, the request 286 may display on an output device 24, 66 a list of options with probabilities or recommendations associated therewith. Thus, for example, a user may see what the probability is that a particular option is best.

A set flag 288 may execute in accordance with inputs provided by a user in response to the request 286. Thus, a user may override at any instance of execution of the recovery module 260, in order to set a flag to indicate an abort, retry, or ignore command, or another appropriate command.

Prior art systems limit the intervention of a user, and yet typically require intervention by a user at a particular point in execution of an application 254. In an apparatus and method in accordance with the invention, a user is afforded many opportunities to intervene by use of a user interrupt 262, yet is not required to intervene.

A test 290 follows the set flag 288 executable or the check 292 and flag set 294. The check 292 may determine whether an error occurred, and what type of error occurred. Thus, instead of a cryptic error message to a user, the expert flag set 294 may determine a best course of action. The information provided by the check 292 and the expert flag set 294 may be used in subsequent execution of the recovery module 260 to provide information to a user in selecting a proper course of action during a request input 286.

Normally, the expert flag set may be programmed to permit only non-catastrophic results. For example, an abort may be made unavailable to the expert flag set 294. Thus, a user would not be exposed to a loss of data, based on a decision by the processor 12, 90.

The test 290 evaluates the case provided by the set flag 288 and the expert flag set 294. An abort will result in an abort return 296. A decision to ignore an error may result in an ignore return 298 or ignore case 298 returning a code to the application 254 indicating that processing should continue. A retry return 300 or retry case 300 may return a retry code.

One may note that the abort case 296 may contain executables besides the simple command to return an abort code. Likewise, the retry case 300 may include other executables, rather than a simple return code. However, the ignore return 298 may typically be minimal, since no cleanup, shutdown, or the like, is required.

After receipt of a suitable return 296, 298, 300, an application 254 may execute a test 302 with suitable jumps to appropriate call statements, code locations, or the like. For example, a retry case 300 may result in re-execution of the setup task 264, with subsequent execution of the application 254 in accordance therewith. Likewise, the abort case 296 may result in execution of an application abort 304.

Meanwhile, an ignore return 298 may result in a simple continue 274 directing the application 254 to proceed with the next step in order. For example, the application executables 274 that follow the task 256, or that are included in the task 256, may be executed.

It should be clear that the task 256 may be imbedded within the application 254, or may be called as a dynamically linked library, a library function, or some other independently coded executable. Thus, the application executables 276 may represent executables following execution following execution of the task 256, or may be tasks subsequent to the set flag 268 in the task 256.

The application 254 shown in the method 250 may correspond directly to the application 124 stored in the memory device 120 of FIG. 5. Likewise, interrupts 132, 262, tasks 126, 256, shutdown 128, 258, and recovery 130, 260 may correspond exactly, approximately, or functionally.

Thus, the apparatus 10, in general, may host the process 250 in the processor 12, and may store all of the memory device 120 in all or part of the RAM 20 or other memory device 14. Similarly, the apparatus 10 may be distributed so that some or all of the executables stored in the memory device 120 are distributed among various nodes 52. In general, the apparatus 10 may execute the method 250 in the processor 12 using the memory device 120 implemented in one or more of the memory devices 14.

Nevertheless, the apparatus 10 of FIG. 2 need not be entirely implemented in a computer. Indeed, the signal generator 68, many functional aspects of the actuator 60, and the task-executing device 62 might be conventional equipment capable of providing suitable signals interpretable by a logical device 70. Likewise, the user input device 64 and user output device 66 might be implemented in a computer, a computer peripheral, or another device.

Similarly, the apparatus 10 of FIG. 3 illustrates an embodiment in which a task-executing device 62, 126, 256 is a transfer device 92 for transferring data. The embodiment of FIG. 3 illustrates a ubiquitous need, that of transferring data without loss. Prior art devices time out, and otherwise inconvenience a user by requiring rebooting, re-entry of data, and the like. This inconvenience may be avoided by implementing the recovery module 100 in the processor 190 in the event of failure by the transfer device 92, at any point.

From the above discussion, it will be appreciated that the present invention provides an apparatus and method for unilaterally-controlled, time-insensitive, recovery of communication links. The apparatus may be implemented on a digital computer having a processor and a memory device operably associated therewith. In general, the invention may be embodied in an actuator having some associated logical device adapted to determine whether a task-executing device actuated by the actuator, has properly executed a desired task. The logical device and actuator may be implemented in mechanical, electrical, electronic, or other apparatus. Optionally, user inputs may be requested in lieu of automated, user-transparent operation of the logical device in re-establishing a communications link without loss of data or loss of operational steps.

One practical implementation of a presently preferred embodiment may be implemented entirely in electronic devices to control transfer of data between a source device and a destination device. Memory data structures are provided for storing executables and data useful to implementation of the invention. Executables may be nested within one another, or may be called and stored from remote locations in one or more memory devices. Likewise, the process steps useful for implementing an apparatus in accordance with the invention may be executed to provide an apparent continuous connection, preserving all data and process steps for a user. The data structures of FIGS. 4–7 and the steps of FIG. 8 may be implemented in an order other than that illustrated.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   an actuator comprising a signal generator effective to provide a task initiation signal;
   a communication link operably connecting the actuator to a task executing device;
   the task executing device adapted to receive the task initiation signal, to execute a task in response thereto, and to return a failure signal in the event of a failure of the task executing device to complete the task;
   a logical device operably associated with the actuator, the logical device being adapted to receive the failure signal, automatically select for the actuator a preferred recovery response to the failure signal, and to communicate an instruction signal to the actuator effective to execute the preferred recovery response independent of the time elapsed after the failure; and
   a memory device operably connected to the actuator, for storing data structures, the data structures comprising:
      a first data set corresponding to execution of the task prior to the failure signal,
      a second data set corresponding to the task executed after the recovery response, and each of the first and second data sets being partitioned at an atomic level, independent from redundancies, checkpoints, rollbacks, conversations, and backwards recoveries.

2. The apparatus of claim 1 wherein the instruction signal corresponds to continuing execution of the task by the task executing device from a step corresponding to the return of the failure signal.

3. The apparatus of claim 2 further comprising a user input device operably connected to the logical device to selectively receive a user input directing the logical device.

4. The apparatus of claim 3 wherein the user input device provides a user signal effective to initiate an interactive exchange of information between the logical device and a user.

5. The apparatus of claim 4 wherein the user input device is adapted to receive instructions from a user corresponding to selective feedback from the task executing device and selective control of the preferred recovery response.

6. The apparatus of claim 3 further comprising a user output device operably connected to the logical device to selectively provide feedback to a user, the feedback indicating the desirability of potential inputs available to a user to send to the logical device.

7. The apparatus of claim 1 wherein the logical device is programmed to automatically continue the task from a condition existing at the occurrence of the failure.

8. The apparatus of claim 1 wherein the selection of a preferred recovery response is independent of the time elapsed after the failure.

9. The apparatus of claim 1 wherein the task executing device and the logical device comprise at least one general purpose digital computing device, and the outcome of the selection of a preferred recovery response is independent from the general purpose digital computing device.

10. The apparatus of claim 1 wherein the logical device selects the preferred recovery path unilaterally with respect to the task executing device.

11. The apparatus of claim 1 wherein the logical device comprises a general purpose computing device having a processor hosting an application, and in which the logical device is programmed into the application to run on the processor, independent of protocols in layers below an application layer level.

12. The apparatus of claim 1 wherein the preferred recovery response comprises a recovery path comprising recovery steps executed by the logical device, and wherein the selection of the preferred recovery response is based on providing a plurality of optional solutions, each with a corresponding heuristic solution analysis presented to a user by the logical device.

13. The apparatus of claim 12 wherein the logical device comprises an artificial intelligence engine to propose the preferred recovery response, and provide the heuristic solution analysis.

14. The apparatus of claim 1 wherein the logical device comprises an artificial intelligence engine to propose a preferred recovery response, and provide to a user a heuristic solution analysis.

15. The apparatus of claim 1, wherein the selection of, and an execution of, the preferred recovery response are executed transparently with respect to a user.

16. The apparatus of claim 1 wherein the task is a transfer of data over the communication link.

17. An apparatus comprising:
a communication link adapted to communicate data;
a processor operably connected to the communication link and programmed to run executables comprising an application executable hosted on the processor and effective to transfer control of the processor to a task, the task being effective to cause a failure signal to indicate a failure of the task to execute completely, and a recovery executable effective to recognize the failure signal, automatically select a recovery method, execute the selected recovery method, preserving a partial data set created by the task, partitioned at an atomic level, and reflecting the state of the task exactly prior to the failure, and cause completion of the task, beginning with executing a step corresponding to the failure independent of the time elapsed after the failure;

a first storage device operably connected to the communication link to store the partial data set corresponding to execution of a first portion of the task prior to the failure, and to store, independent from redundancies, checkpoints, rollbacks, conversations, and backwards recoveries, and after execution of the recovery method, a completion data set corresponding to a second portion of the task executed after the failure.

18. The apparatus of claim 17 further comprising an input device operably connected to selectively generate an interrupt signal in response to actuation of the input device by a user.

19. The apparatus of claim 17 further comprising an output device operably connected to the communication link to selectively provide to a user feedback corresponding to control of the recovery method.

20. The article of claim 17 further comprising an interrupt block storing data corresponding to an interrupt input by a user.

21. The article of claim 17 further comprising an artificial intelligence block storing an artificial intelligence executable effective to be loaded into the processor to automatically determine a preferred method to recover the task.

22. The article of claim 21 further comprising a user output block storing data corresponding to an analysis of the artificial intelligence executable, and effective to instruct a user regarding available options and associated desirabilities thereof in response to an interrupt input by a user.

23. An article comprising a memory device provided with blocks of memory adaptable to store executables and data, the memory device comprising:

a first block storing a task executable to be loaded to run on a processor operably connected to the memory device;

a second block storing an application, the application having integrated therein a recovery executable to be loaded to run on the processor upon a failure of the task executing device to complete execution of a task;

a third block persistently storing first data comprising each atomic unit of data generated by the task executing device, exclusively prior to the failure;

a fourth block storing second data generated by the task executable, exclusively after the failure, the first and second data corresponding together comprising a complete data set indistinguishable from a normal data set generated by the task executable executing the task normally without the failure; and a recovery control data block comprising data containing an abort flag used by the recovery executable to recover the task after the failure and effective to disable all further attempts to execute recovery processes.

24. The article of claim 23, wherein the application contains an executable effective to invoke the task executable.

25. The article of claim 23 further comprising a shutdown executable block storing a shutdown executable within the application effective to direct execution of the recovery executable.

26. A method of auto-recovery of a task operating on a computer, the method comprising:

providing a processor for operating executables, the processor being operably connected by a datalink to a memory device for storing executables and data;

providing an application comprising a plurality of executables executable on the processor, the application also comprising an initiation executable effective to initiate a task executable and comprising a recovery executable effective to recover the task executable following a failure of the task executable to complete execution;

operating the application;

invoking the task executable, preserving first data generated during execution;

determining that a failure of the task executable has occurred;

invoking automatically the recovery executable to recover the task to a state existing at the time of the failure;

completing the task, generating second data, mutually exclusive of the first data, during execution thereof following the failure, the first and second data forming a non-redundant, complete data set, corresponding to, and indistinguishable from, a normal data set generated by the task operating without failure.

27. The method of claim 26 further comprising saving, at an atomic level recognized by the task executable, the first data generated by the task executable prior to the failure.

28. The method of claim 26 further comprising receiving an interrupt input by a user; and providing to a user a heuristic analysis of options to effect a recovery of the task after the failure, with an evaluation reflecting a desirability of each.

29. The method of claim 26 wherein the recovery executable is effective to recover the task independently from time elapsed after the failure.

* * * * *